Aug. 4, 1959    C. N. MENZ    2,897,693
DRILLING APPARATUS
Filed May 28, 1956    7 Sheets-Sheet 1
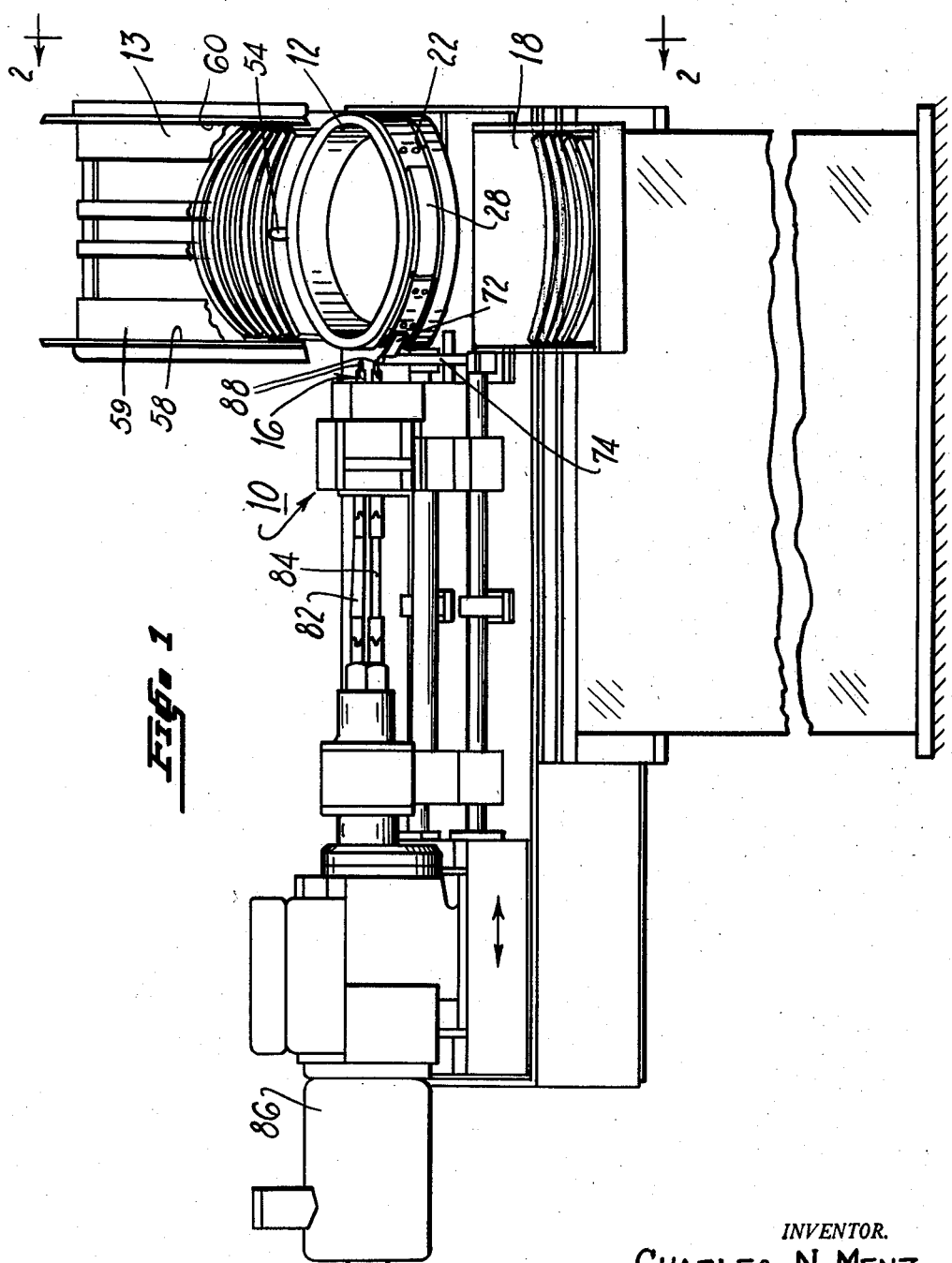
INVENTOR.
CHARLES N. MENZ
BY
John A. Young
ATTORNEY Aug. 4, 1959

C. N. MENZ 2,897,693

DRILLING APPARATUS

Filed May 28, 1956

INVENTOR.
CHARLES N. MENZ
BY John A. Young
ATTORNEY

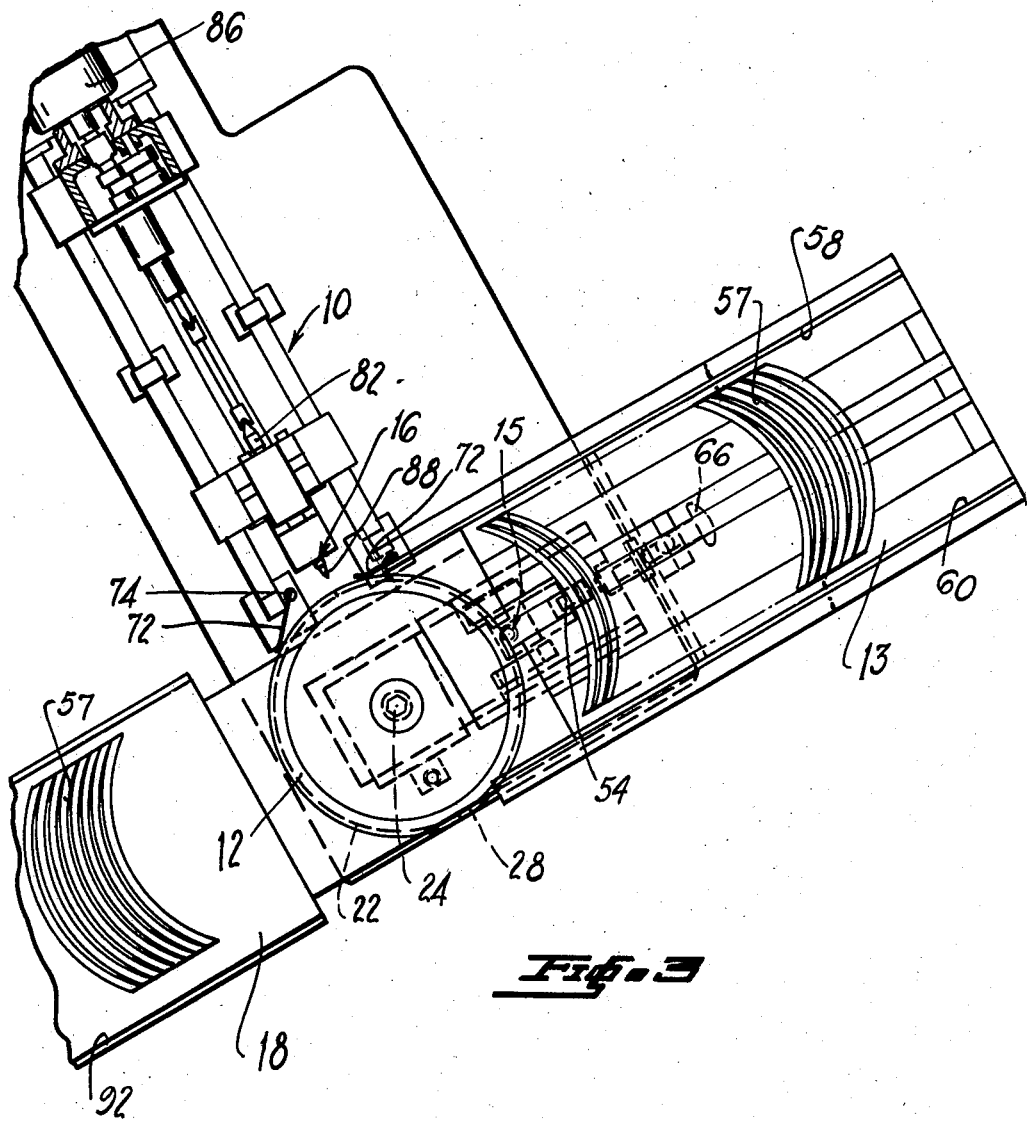

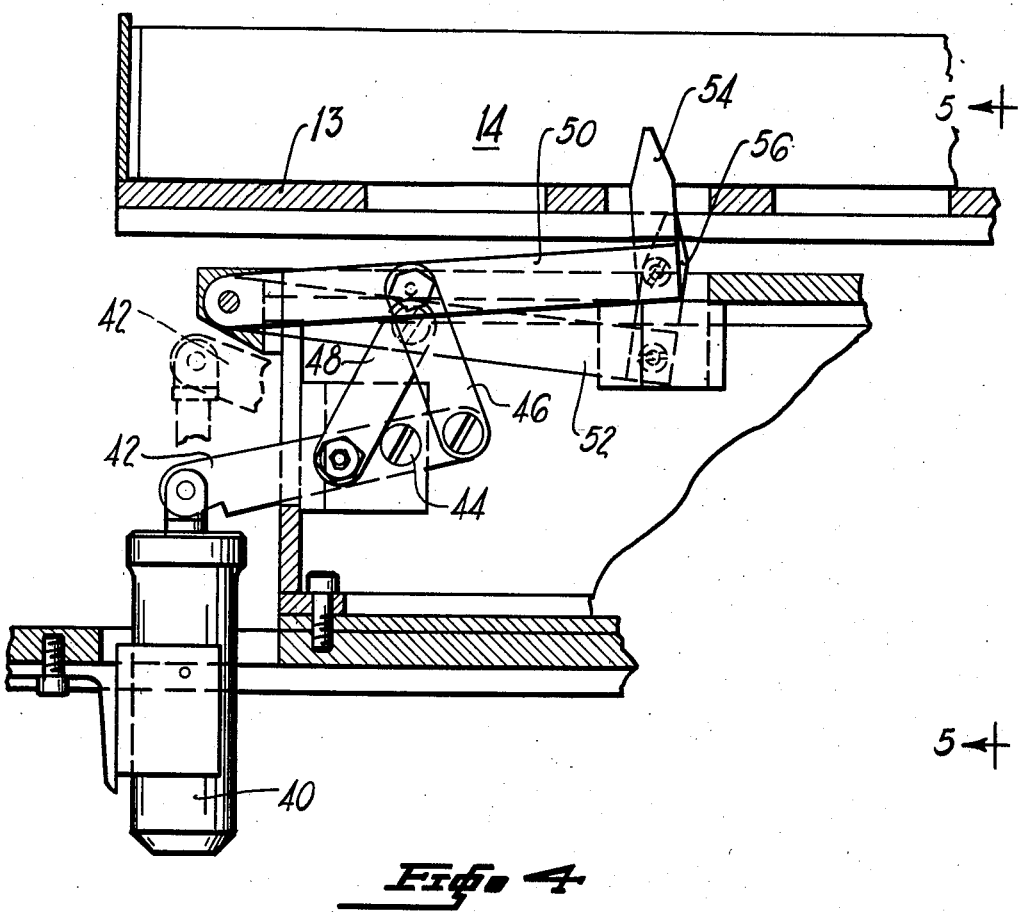

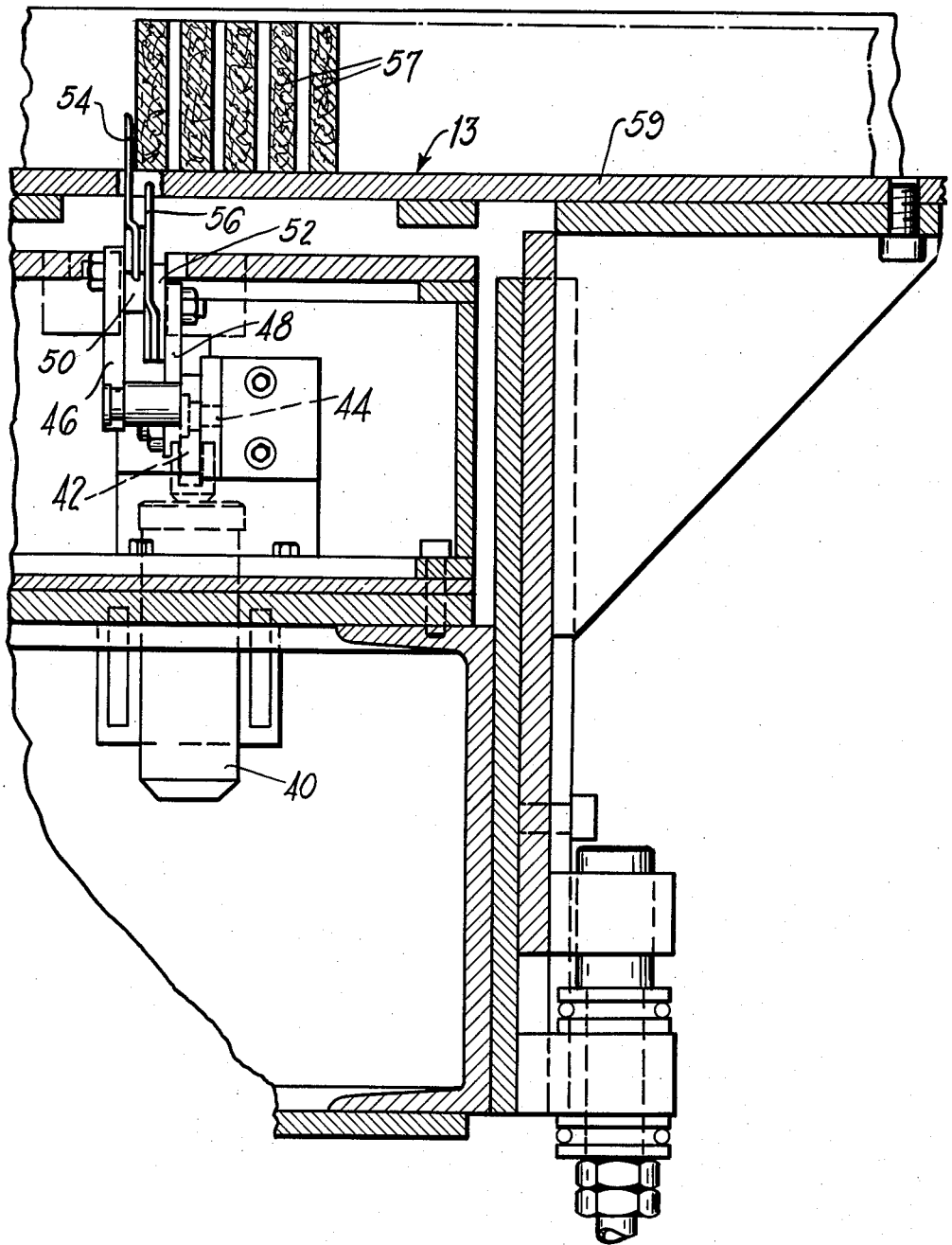

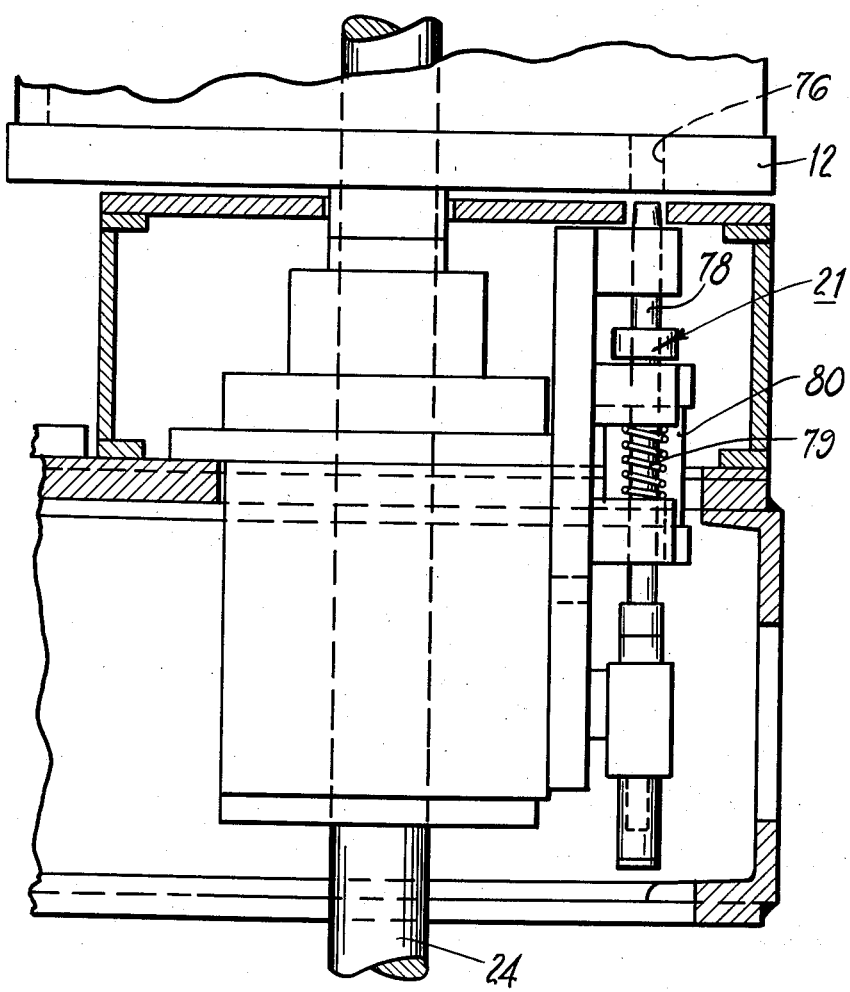

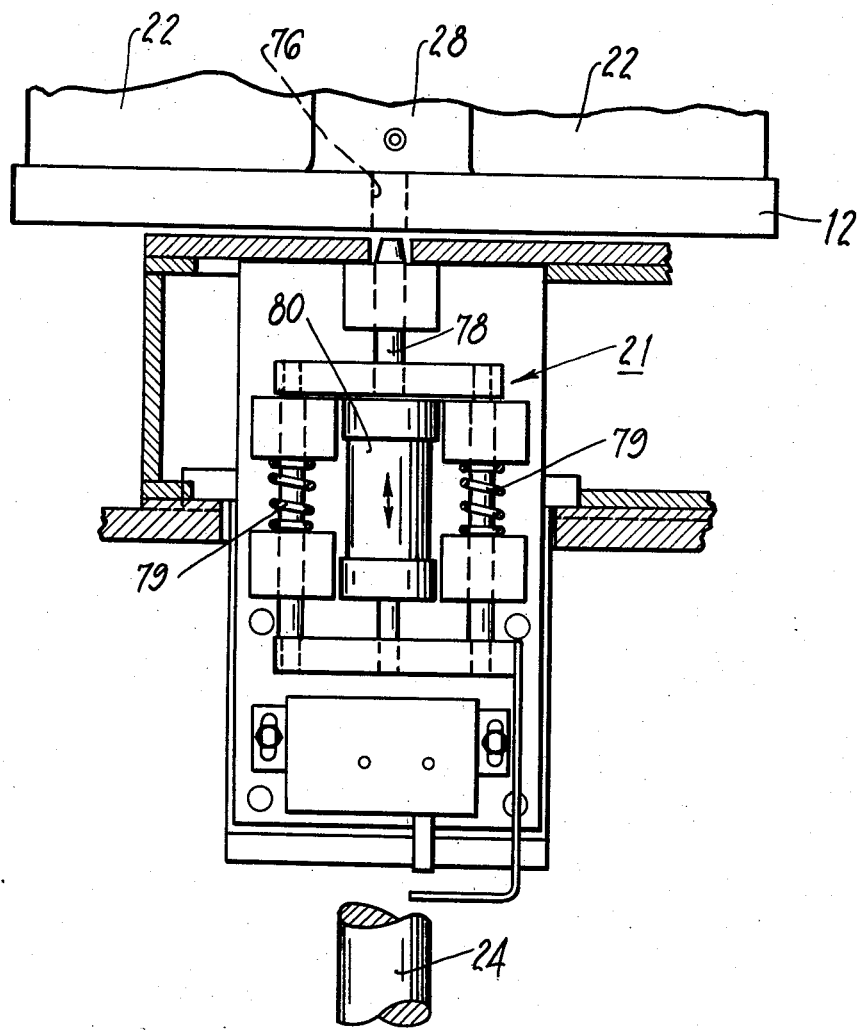

United States Patent Office

2,897,693
Patented Aug. 4, 1959

2,897,693

DRILLING APPARATUS

Charles N. Menz, Troy, N.Y., assignor to Bendix Aviation Corporation, South Bend, Ind., a corporation of Delaware Application May 28, 1956, Serial No. 587,664

12 Claims. (Cl. 77—22)

This invention relates to a drilling apparatus for brake lining in which arcuate lining segments are automatically drilled at selected locations along the length of the lining segments.

In the construction of a brake shoe, the lining segment may be joined to the rim of the shoe by means of rivets. In constructing the brake shoe in this manner, there must be provided spaced pairs of holes in the brake lining which are matched with companion openings in the rim. Rivets are then passed through these aligned openings in the rim and lining and swaged so that the lining is fixedly secured to the rim of the shoe.

This invention proposes a method for drilling the openings in the arcuate lining segment in preparation for the riveting operation.

tI will be appreciated that lining segments are demanded in various quantities. In the replacement lining market, the volume of lining segments is somewhat erratic because of fluctuating demands. It is seldom worthwhile for lining manufacturers to maintain, in stand-by condition, expensive machines (in which set-up time is appreciable), to make lining segments in small quantities. There is a problem of how to develop a process for drilling holes in arcuate lining segments which can be readily practiced for low production volume linings.

A further problem is to develop a machine which will enable practicing this process, said machine lending itself, by versatile operation, to numerous and extensive modifications such as size of openings, relative location (pattern), and hardness of lining. The over-all requirement of such a machine is that these various adjustments may be made with facility.

According to the foregoing statements, it is an object of the invention to reduce the time required for "setting up" an apparatus which is adapted to process lining segments.

Along with the foregoing objects and related thereto, is my object to construct which is easily regulated to obtain a selected pattern of imprints on the lining segments.

One of the principal objects of the invention is to embody all of the preceding features in an apparatus which is operable by as nearly automatic sequences as possible in order to reduce cost and obtain satisfactory volume operation.

Other objects and features of the invention will become apparent from the following description, taken in connection with the accompanying drawings, wherein:

Figure 1 is a front elevation of the apparatus with the upper part of the magazine removed;

Figure 3 is a top view of the apparatus;

Figure 4 is an enlarged detail view of the dispensing device taken along line 4—4 of Figure 2;

Figure 5 is a side view of Figure 4 looking in the direction indicated by the arrows 5—5 in Figure 4; and Figures 6 and 7 are enlarged detail views of the index mechanism.

Figures 2, 2A:
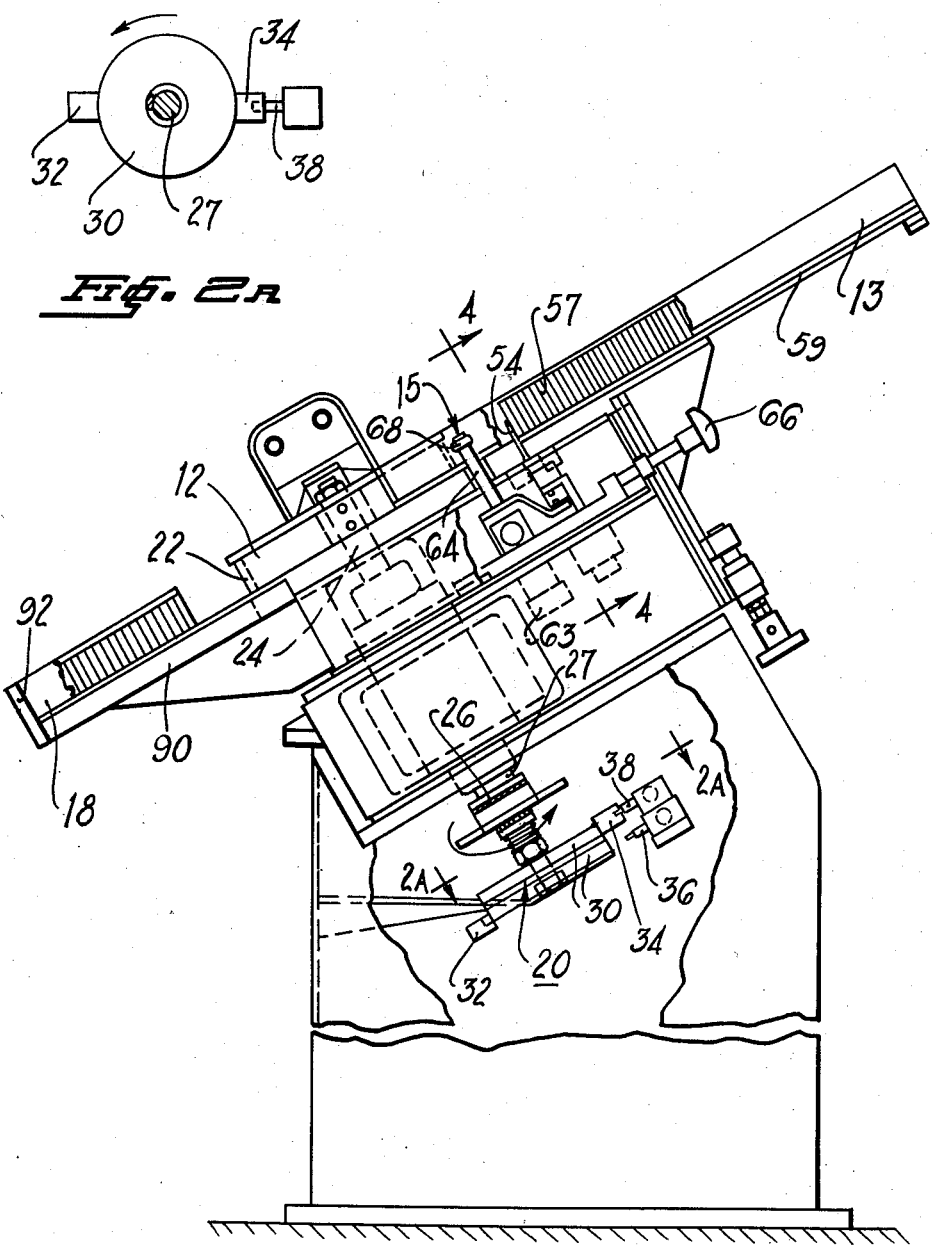
Figure 2 is a side view of the apparatus looking in the direction indicated by arrows 2—2 of Figure 1.
Figure 2A is a detail view taken on line 2A—2A of Figure 2.

The drilling apparatus, indicated generally by reference numeral 10 consists broadly of a rotatable drum 12 serving as a fixture for the lining segments; a lining feed storage 13 and dispensing apparatus 14 (Figure 4) in combination therewith; drilling means 16; a storage 18 (Figure 3) where the finished lining segments are received; a control means 20 for coordinating movement of the drum 12 and feeder mechanism 14; and an index mechanism 21 which locates the segment to determine where the drilling is performed.

Fixture

The rotatable drum 12 is a cylindrical carrier having arcuate recesses 22 which are formed in the outer periphery of the drum. The drum is turned by a shaft 24 (Figures 2 and 3) which is splined or otherwise secured to the drum. The shaft 24 is driven through a friction clutch 26 by a power mechanism (not shown) of any suitable character which is connected with sprocket 27.

It will be noted from Figures 1, 3 and 7 that the recesses 22 in the periphery of the drum 12 are separated by spacing members 28. The spacing members can be varied to change the arcuate lengths of the recesses and thus accommodate different size lining segments.

Control means

Carried at the end of the shaft 24 are two rotatable devices 30 which make up control means 20. The rotatable devices have contact lugs 32 and 34 which are spaced 180° apart. The contact lugs actuate microswitches 36 and 38 to thereby control operation of dispensing apparatus 14 and lining clamping means 15.

It will become apparent from a consideration of the operation of the device that the dispensing apparatus 14 is coordinated with rotation of the drum through control means 20. Each of the microswitches 36 and 38 is adapted to control circuitry in any well known manner to operate air cylinder 40 (Figures 4 and 5).

Dispensing apparatus

The air cylinder 40 is connected to a lever 42 which is fulcrumed at 44. The lever 42 has links 46 and 48 which are connected to arms 50 and 52, respectively. It will be noted that the arms 50 and 52 are equipped with projecting fingers 54 and 56 that are movable in an upward direction (Figures 4 and 5) to hold a stack 57 of arcuate lining segments against downward movement in the feed storage 13. The stack 57 of arcuate lining segments tends to move downwardly by gravity feed. The fingers 54 and 56 alternately support the stack of linings, preventing downward slippage except as the lining segments are individually fed to the drum as required.

Feed storage

Feed storage 13 consists of an inclined rack 59 having sidewalls 58 and 60 which guide the lining segments in their downward movement toward the rotatable drum 12 (Figure 1).

Just below the feed storage 13 is a clamping mechanism designated generally by reference numeral 15 (Figure 2). The clamping member holds the lining segment against the drum during processing thereof. The clamping mechanism includes a roller 68 which reciprocates vertically in coordination with feeder storage operation. An air cylinder 63 controls reciprocable movement of the roller, said air cylinder being regulated by the control means 20. A knob 66 (Figure 2) is manually adjusted to move the pressure roller 68 on the end of post 64 either toward or away from the rotatable drum to make allowance for different thicknesses of linings. The clamping mechanism is spring loaded so that the pressure roller 68 which bears against the outer surface of the lining will keep the lining segment within the recess 22 at the outer periphery of the drum.

Additional guide means (Figures 1, 3) are provided to hold the lining segment in place during drilling thereof. This additional guide means cooperates with the roller 68 in holding the lining within the recess 22 and comprises two spaced springs 72 on the end of a post 74. The springs 72 bear against the outer surface of the lining and exerts a radial force to hold the lining against the drum.

Index mechanism

The index mechanism 21 (Figures 6, 7) is located at the underside of the drum 12 (see Figures 6 and 7). A number of circumferentially spaced openings 76 are provided in the bottom of the drum. The location of these openings determines the circumferential position wherein the drum is held fixed. The circumferential stopped position of the drum determines the angular position of the lining segment when drilling is to be performed. By proper location of the opening 76, a drilling step can be executed at any angular location on the arcuate lining segment.

A stop pin 78, actuated by an air cylinder 80, is movable upwardly (Figure 7) to pass into opening 76 and thereby lock the drum against further circumferential movement. A timer (not shown) is provided which operates the air cylinder 80 to withdraw the stop pin 78 from opening 76 after the drilling step is performed. Since the drum is rotated through a friction clutch it will resume movement until the succeeding opening in the drum is encountered whereupon the pin 78 is impelled into the opening to again lock the drum and repeat the drilling step. The springs 79 hold the stop pin 78 in a normally retracted position indicated in Figures 6 and 7.

The index mechanism 21 and reciprocating drills 16 are coordinated so that the drills are brought against the lining responsively to operation of the index mechanism 21.

Any of the openings 76 can be plugged so that the index mechanism will skip operation. Also, the number and relative location of the openings can be arranged to provide the desired pattern of drilling for the lining segment.

Drilling means

The drilling means 16 is located on a horizontal level at about a 90° angle with storage 13. The drilling means includes two spindles 82 and 84 which are reciprocated by a power device 86. At the ends of the spindles 82 and 84 are two rotating drills 88 which can be adjustably spaced apart as required. When the power device 86 causes the spindles 82 and 84 to move toward the right (Figure 1), the drills 88 form holes in the surface of the lining at the angular location determined by the circumferential position of the drum when it is stopped by the index mechanism 21.

Storage

After the linings are drilled, they are released from the drum and drop into a storage 18 (Figure 3) which is located at a lower level than the drum. The storage 18 may consist of an inclined frame 90 (Figure 2) and sideboards 92 which prevent the drilled linings from falling out of the storage.

At the start of the drilling operation, the lining feed storage 13 is provided with a number of lining segments. The dispensing apparatus is initially positioned as shown in Figure 5. The stack of linings is held by the lower finger 54 and the other finger 56 is below the bottom level of the feeder storage 13.

When the machine is started the drum begins rotation and control means 20 (Figure 2), acting through one or the other of the lugs 32 and 34, causes contact with either of the microswitches 36 or 38 to operate the dispensing mechanism 14 which releases the lowermost lining segment.

When either of the microswitches 36 or 38 is actuated, the air cylinder 40 (Figure 4) is actuated so that lever 42 is turned clockwise about pivot 44. Link 46 is lowered and link 48 is raised; the finger 54 recedes below the surface of the inclined rack 59, thus releasing the lowermost lining segment which drops into one of the aligned recesses 22 of the rotatable drum. The downward movement of the lining segment is guided by side walls 58 and 60. While the lowermost lining segment is being dispensed, the stack is held temporarily by finger 56. After the lowermost lining segment is dispensed, the motor 40 is once again operated by a timer so that lever 42 turns counterclockwise on fulcrum 44. Finger 56 is now lowered and finger 54 raises (Figures 4 and 5), thus shifting support of the stack of segments from finger 56 to finger 54.

Simultaneously with actuation of the dispensing apparatus 14, the control means 20 (Figure 2) also actuates the clamping mechanism 15. The air cylinder 63 associated with the clamping mechanism, is operated to lower the pressure roller 68 so that it clears the descending lining segment as it falls toward the drum 12. After the lining segment reaches the drum 12 and is located in the arcuate recess 22, the air cylinder 63 is again actuated to raise the pressure roller 68. The pressure roller 68 is spring loaded to bias it radially against the outer surface of the lining segment and thus hold it in place during the drilling operation.

In brief summary—the control means 20 regulates operation of the dispensing means 13 and clamping mechanism 15. The control means cycles twice during each revolution of the drum so that two lining segments are processed per each drum revolution. It will be noted that the recesses 22 are in alignment with the descending lining segment so that it can fit therein.

After the lining segment is positioned in the drum 12, rotation of the drum and lining commences until the first of a series of openings 76 (Figures 6 and 7) in the bottom of the drum aligns with stop pin 78. The stop pin enters the opening 76 and locks the drum 12 against rotation. This locking of the drum is permitted since there is a friction clutch 26 connection (Fig. 2) between the power drive turning the sprocket 27 and shaft 24. It is so provided that drum locking occurs at the desired angular location of the segment in relation to drills 88. While the drum is locked, the drills 88 are turning and the spindle reciprocates to bring the drills against the arcuate segment where they produce openings in the surface of the lining segment. After the openings are formed, a timer (not shown) returns the spindles 82 and 84 and the stop pin 78 withdraws from opening 76 whereupon the drum resumes rotation until the next opening 76 is encountered. The drum is here locked again and the drilling operation is repeated at the succeeding angular position of the lining.

This process of indexing and drilling continues until the lining segment drilling is completed. The segment has now been rotated 180° and, being free of the locking means 15 and 72, it drops into storage 18. At this point one of the lugs 32 or 34 (Figure 2) has moved into engagement with either of microswitches 36 or 38 so that control means 20 is again operated. The dispensing and locking steps are repeated, thus bringing a new lining segment onto the drum.

It will thus be seen that 180° movement of the drum provides a complete cycle of dispensing-drilling and ejecting of the finished lining segment.

The operation is continuous as described. The lining segments are dispensed and drilled in sequence. All that the operator must do is to keep lining segments in the feed storage and remove the finished lining from the storage 18.

One of the important features of this invention is the ease with which the machine is set up to perform a desired kind of drilling operation. The space between the openings is readily provided by merely moving the drills 88 either closer or farther apart. The size of the opening is obtained by selecting the proper size drill. The spacing of the openings is quickly determined by unclosing the desired number of openings 76 which are suitably spaced apart at the underside of the drum.

Different arcuate lengths of lining segment are provided for by varying the size of the recesses 22. This is accomplished by changing spacing members 28.

Once the machine is set up for a given pattern of drilling, any number of segments may be processed. Since the set-up is accomplished so easily and with such facility, a relatively few number of lining segments may be processed economically.

Although the invention has been described in connection with a specific mechanism, it will be readily appreciated that the principles are general in nature and are therefore capable of general application.

I claim:

1. An apparatus for drilling spaced openings in arcuate lining segments comprising a rotatable circular member having at least one arcuate indentation in the perimeter thereof, means operatively associated with said circular member for producing rotation thereof, a device in conjunction with said circular member which holds the circular member against rotation at selected angular positions to position the lining segment at selected locations along the length thereof, a pair of reciprocable drilling elements which produce laterally spaced apart openings in the lining segment when the segment is moved lengthwise past the drills by a selected amount and thereafter held in a selected angular position, the operation of said drilling elements being coordinated with said device which holds the circular member in the selected angular position, an elevated magazine for storing lining segments therein, a feeder mechanism which is actuatable responsively to location of said circular member, said feeder mechanism being arranged to dispense singular lining segments, a retaining element which holds the lining segment against the periphery of the circular members, and a storage means for receiving drilled lining segments.

2. A drilling apparatus for arcuate lining segments comprising: a rotatable drum having lining-segment-receiving recesses in the perimeter thereof, means for turning said drum including a friction clutch connection which permits said rotatable drum to be held against rotation, said drum being rotatable in a plane which includes the longitudinal axes of the arcuate lining segments control means which is operated by turning movement of said drum, a lining storage which is elevated so that lining segments are gravity fed into the recess provided in said drum, means for supporting the lining segments in said storage and individually dispensing them responsively to location of said drum, said last mentioned means being operated by said control means so that the lining segment is dropped into the recess in said drum, a clamping element which holds the lining segment in the recess during drilling operation, means for holding the drum in preselected angular positions, two reciprocable drilling elements which drill holes therein and retract while the drum is held against rotation, means for releasing the drum whereby it moves to a next angular position wherein the drilling elements are re-actuated, and a lining-segment-receiving storage wherein drilled lining segments are dropped when the selected number of angularly spaced openings have been drilled therein.

3. An apparatus for drilling openings in lining segments comprising a rotatable drum having lining-segment-receiving slots formed in the periphery thereof, said rotatable drum being turnable in a plane which includes the planar position of the lining segments in its dispensing position an elevated magazine for storing a plurality of lining segments which are gravity fed into the slots in said drum, a dispensing means for releasing individual lining segments, said dispensing means being operated synchronously with said drum movement whereby the dispensed segments drop into the recesses in said drum and are locked therein, means for holding the drum in selected angular positions according to the location of the openings to be drilled in the lining segment, a reciprocable drilling element which is actuatable toward a drilling position to form openings in said segment and then retracted therefrom while the drum is held against rotation, and means for receiving the lining segments when the drilling operation is completed.

4. An apparatus for drilling laterally spaced openings at selected angular positions on arcuate lining segments, said apparatus comprising a circular carrier having recesses therein, said circular carrier being turnable in a direction colinearly with the length dimension of the lining segment, a magazine for storing lining segments, means cooperatively associated with said magazine for dispensing lining segments, a control device for operating said means, said control device being operated by said circular carrier so that lining segments are dropped into the recesses of the carrier and are locked therein, means for holding said circular carrier in preselected angular positions determining the locations of openings to be drilled in the lining segment along the length thereof, and a reciprocable device including drilling elements, said reciprocable devices being automatically operatable while the segment is held in the selected position to form openings in the lining segment at the determined location.

5. An apparatus for forming holes in lining segments comprising a circular disc-shaped member having a plurality of recesses in the periphery thereof, means for holding said circular member against rotation at preselected angular positions along the circumference of said circular disc shaped member, a dispensing device which gravity feeds individual lining segments into the recesses provided in said circular member when the recess registers with the lining segment to be dispensed, means for discharging the processed lining segment from the circular member independently of the feeding of lining segments to the circular member, a drilling mechanism which is operatable in coordination with said means which hold the circular member so that openings are drilled in preselected locations along the length of the lining segment.

6. An apparatus for processing arcuate friction linings comprising a rotatable disc shaped drum which serves to position lining segments within recesses formed in the periphery thereof for rotation with said drum, said disc shaped drum being rotatable to advance the lining segments in a direction coextensive with the length thereof, means for locking the drum in selected angular positions, a dispensing device which feeds individual lining segments to said drum and is operated coordinately with movement of said drum, and a drilling device which forms openings in said lining at locations determined by the angular position wherein the drum is stopped, said drilling device being coordinated with movement of said drum to form a selected number of openings in locations determined by angular positions in which the drum is stopped.

7. An apparatus for processing arcuate linings comprising a rotatable disc shaped element having a plurality of segments for receiving said linings and carrying them therewith, means for holding said rotatable element in selected angular positions according to the location required along the length of the arcuate lining whereby the arcuate lining is held in a plurality of angular positions which correspond to relative spacings along the length thereof, a feeder mechanism which conveys the lining to the rotatable element and is coordinated with the position occupied by said rotatable element, means for withdrawing a finished arcuate lining independently of the feeder mechanism, and a processing device which is successively actuatable with reference to the same arcuate lining segment to form the desired processing pattern on the segment.

8. A brake lining processing device comprising a rotatable disc-shaped member having an axis of rotation transverse to the lining segments which are fed thereto, said disc-shaped member having portions for receiving and carrying pieces of lining therewith, means for holding the disk-shaped member against rotation in selected angular positions for determinate period, a feeder mechanism coordinated with operation of said disk-shaped member, and a lining processing mechanism which is successively actuatable in coordination with operation of said disk-shaped member so that with respect to the same arcuate lining segment a plurality of processing steps is performable thereon at spaced distances along the length of the arcuate segment.

9. A brake lining processing apparatus comprising means for receiving and angularly positioning the lining by swinging the lining in the direction of its length to various selected angular positions along the length thereof, means for processing the lining when it is held in successive angular positions, and means for dispensing linings for location in said first mentioned means.

10. In an apparatus for processing lining segments, a dispensing mechanism comprising a vertically inclined magazine, a guide element on the sides of said magazine to ensure proper position for the lining segments as they are individually fed, a first means for holding a stack of lining segments through engagement with the lowermost segment, a device for releasing said lowermost segment and temporarily retaining the stack by engagement with an adjacent segment, a second means for transferring the support of the stack from said device to said first mentioned means, an indexable rotary means collinear with the stack of lining segments, said rotary means serving to swing the lining segments on an axis transverse to the feeding movement of the lining segments.

11. An apparatus for drilling spaced openings in arcuate lining segments comprising a rotatable circular member having at least one arcuate indentation in the perimeter thereof, means operatively associated with said circular member for producing rotation thereof, a device in conjunction with said circular member which holds the circular member against rotation at selected angular positions, a pair of reciprocable drilling elements which produce laterally spaced apart openings in the lining segment when the segment is held in a selected angular position, the operation of said drilling elements being coordinated with said device which holds the circular member in the selected angular position, an elevated magazine for storing lining segments therein, a feeder mechanism which is actuatable responsively to location of said circular member, said feeder mechanism being arranged to dispense singular lining segments, and a retaining element which holds the lining segment against the periphery of the circular members.

12. A drilling apparatus for arcuate lining segments comprising: a rotatable drum having lining-segment-receiving recesses in the perimeter thereof, means for turning said drum including a connection which permits said rotatable drum to be held against rotation, control means which is operated by turning movement of said drum, a lining storage from which lining segments are fed into the recess provided in said drum, means for supporting the lining segments in said storage and individually dispensing them responsively to location of said drum, said last mentioned means being operated by said control means so that the lining segment is dropped into the recess in said drum, a clamping element which holds the lining segment in the recess during drilling operation, means for holding the drum in preselected angular positions, two reciprocable drilling elements which drill holes therein and retract while the drum is held against rotation, and means for releasing the drum whereby it moves to a next angular position wherein the drilling elements are re-actuated.

References Cited in the file of this patent

UNITED STATES PATENTS

| | | |
|---|---|---|
| 759,205 | Wattie | May 3, 1904 |
| 1,719,230 | McDonald | July 2, 1929 |
| 1,846,645 | Lach | Feb. 23, 1932 |

UNITED STATES PATENT OFFICE
CERTIFICATE OF CORRECTION

Patent No. 2,897,693                                            August 4, 1959

Charles N. Menz

It is hereby certified that error appears in the printed specification of the above numbered patent requiring correction and that the said Letters Patent should read as corrected below.

Column 1, line 30, for "tI" read -- It --; line 52, after "construct" insert -- an apparatus --.

Signed and sealed this 19th day of April 1960.

(SEAL)
Attest:

KARL H. AXLINE                                               ROBERT C. WATSON
Attesting Officer                                         Commissioner of Patents